United States Patent
Kwon et al.

(10) Patent No.: US 9,450,739 B2
(45) Date of Patent: Sep. 20, 2016

(54) METHOD AND DEVICE FOR AVOIDING MACRO INTERFERENCE

(71) Applicant: Intellectual Discovery Co., Ltd., Seoul (KR)

(72) Inventors: Jung Hyoung Kwon, Seoul (KR); Young Jin Sang, Seoul (KR); Kwang Soon Kim, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 18 days.

(21) Appl. No.: 14/411,756

(22) PCT Filed: Jul. 1, 2013

(86) PCT No.: PCT/KR2013/005806
§ 371 (c)(1),
(2) Date: Dec. 29, 2014

(87) PCT Pub. No.: WO2014/003504
PCT Pub. Date: Jan. 3, 2014

(65) Prior Publication Data
US 2015/0195078 A1 Jul. 9, 2015

(30) Foreign Application Priority Data
Jun. 29, 2012 (KR) .................. 10-2012-0071071

(51) Int. Cl.
*H04L 5/00* (2006.01)
*H04W 72/08* (2009.01)
*H04W 48/20* (2009.01)
*H04W 84/04* (2009.01)

(52) U.S. Cl.
CPC ........... *H04L 5/0073* (2013.01); *H04L 5/0053* (2013.01); *H04W 48/20* (2013.01); *H04W 72/082* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 8,428,519 B2 | 4/2013 | Sahin et al. | |
| 2010/0097965 A1 | 4/2010 | Kwon et al. | |
| 2011/0237243 A1* | 9/2011 | Guvenc | H04L 5/0032 455/423 |
| 2011/0250897 A1 | 10/2011 | Seo et al. | |
| 2011/0312317 A1 | 12/2011 | Sahin et al. | |
| 2012/0176955 A1* | 7/2012 | Ishii | H04W 72/042 370/315 |
| 2013/0194982 A1* | 8/2013 | Fwu | H04W 72/085 370/280 |
| 2013/0243241 A1* | 9/2013 | Shaick | G06K 9/00261 382/103 |
| 2013/0272170 A1* | 10/2013 | Chatterjee | H04W 28/02 370/280 |

FOREIGN PATENT DOCUMENTS

| | | |
|---|---|---|
| JP | 2012-005131 A | 1/2012 |
| KR | 10-2010-0044666 A | 4/2010 |
| KR | 10-0986649 B1 | 10/2010 |
| KR | 10-2011-0092708 A | 8/2011 |

* cited by examiner

Primary Examiner — Kodzovi Acolatse
(74) Attorney, Agent, or Firm — Rabin & Berdo, P.C.

(57) ABSTRACT

Provided are a method and a device for avoiding interference of an uplink in a macro cell within a heterogeneous cellular network system. A femtocell base station calculates a degree of the interference of the uplink in the macro cell, and determines whether the interference is strong. If the interference of the uplink in the macro cell is strong, the femtocell base station changes the order of a femtocell uplink frame and a femtocell downlink frame.

10 Claims, 6 Drawing Sheets

METHOD AND DEVICE FOR AVOIDING MACRO INTERFERENCE

TECHNICAL FIELD

The present invention relates to communication in a heterogeneous cellular network system and, more particularly, to a method and apparatus for avoiding uplink interference in a macrocell included in the heterogeneous cellular network system.

BACKGROUND ART

A heterogeneous cellular network may be a cellular network including a macrocell and a femtocell. The heterogeneous cellular network may be realized by disposing a femtocell in an indoor region and a shadow region in the macrocell, thereby enhancing a terminal communication performance.

The femtocell may be classified into 1) a closed femtocell allowing access to only an authorized terminal and 2) an open femtocell allowing access to any terminal.

The closed femtocell may enhance a performance of the authorized terminal and robust to a security. Thus, the closed femtocell may be widely used for the heterogeneous cellular network.

In the closed femtocell, interference occurring between a macrocell and a femtocell may be an issue causing degradation in the performance of the femtocell. A number of methods may be used to solve this issue.

In one method, frequency resources of the macrocell and frequency resources of the femtocell may be allocated so as to be orthogonal to one another. The method may cause interference between the macrocell and the femtocell. However, a performance for each of the macrocell and the femtocell may be limited due to restrictions on a use of the frequency resources.

In another method, a portion of frequency resources may be allocated as shared frequency resources to be used by the macrocell and the femtocell, and remaining frequency resources may be allocated as exclusive frequency resources used by the macrocell or the femtocell. By using the method, one of the macrocell and the femtocell may not be allowed to use all frequency resources.

Accordingly, there is a desire for a method of enhancing a communication performance in the heterogeneous cellular network by avoiding interference between the macrocell and the femtocell while each of the macrocell and the femtocell is allowed to use the all frequency resources.

DISCLOSURE OF INVENTION

Technical Goals

An aspect of the present invention provides a method and apparatus for switching ordinal positions between a femtocell uplink frame and a femtocell downlink frame when uplink interference occurring in a macrocell is strong.

Another aspect of the present invention also provides a method and apparatus for switching ordinal positions of a femtocell uplink frame and a femtocell downlink frame and relaying macrodata to be transmitted from a macro terminal to a macro base station.

Technical Solutions

According to an aspect of the present invention, there is provided a communication method of a femtocell base station, the method including determining whether an operation is to be performed by switching ordinal positions of a femtocell uplink frame and a femtocell downlink frame in a femtocell based on a degree to which macro uplink interference affects a performance of the femtocell in the femtocell base station, processing a transmission of the femtocell uplink frame based on the switched ordinal positions, and processing a transmission of the femtocell downlink frame based on the switched ordinal positions.

The determining may include calculating the degree based on a reception signal-to-noise ratio (SNR) for each point in time within a predetermined time interval.

The determining may include determining whether a gain of the performance is achieved by switching the ordinal positions of the femtocell uplink frame and the femtocell downlink frame.

The communication method may further include transmitting a request for information associated with a macrocell terminal to a macrocell base station, and receiving a response to the request from the macrocell base station.

The communication method may further include transmitting, to a macrocell base station, information on whether the ordinal positions of the femtocell uplink frame and the femtocell downlink frame are switched.

The femtocell uplink frame may include femtocell uplink data transmitted from a femtocell terminal to the femtocell base station.

The femtocell downlink frame may include femtocell downlink data transmitted from the femtocell base station to the femtocell terminal.

The transmission of the femtocell uplink frame based on the switched ordinal positions may be performed during a process of transmitting a macrocell downlink frame in a macrocell base station.

The transmission of the femtocell downlink frame based on the switched ordinal positions may be performed during a process of transmitting a macrocell uplink frame in the macrocell base station.

The communication method may further include receiving, from a macrocell base station, a request to relay macrodata to be transmitted from a macrocell terminal to the macrocell base station.

The communication method may further include receiving the macrodata from the macrocell terminal, and transmitting the macrodata to the macrocell base station.

The processing of the transmission of the femtocell downlink frame and the transmitting of the macrodata to the macrocell base station may be concurrently performed based on a superposition coding scheme.

According to another aspect of the present invention, there is also provided a femtocell base station including a processor to determine whether an operation is to be performed by switching ordinal positions of a femtocell uplink frame and a femtocell downlink frame in a femtocell based on a degree to which macro uplink interference affects a performance of the femtocell in the femtocell base station, and a networking unit to process a transmission of the femtocell uplink frame and a transmission of the femtocell downlink frame based on the switched ordinal positions.

According to still another aspect of the present invention, there is also provided a communication method of a macrocell base station, the method including receiving information on whether ordinal positions of a femtocell uplink frame and a femtocell downlink frame are switched, from each of a plurality of femtocell base stations, selecting one of femtocell base stations transmitting the information among the plurality of femtocell base stations, as a relay femtocell base station to relay macrodata, transmitting the request to the relay femtocell base station, and transmitting information associated with the relay femtocell base station to a macrocell terminal, wherein the macrodata is data to be transmitted from the macro terminal to the macrocell base station.

The relay femtocell base station may be a femtocell base station corresponding to a maximum SNR among SNRs of the macrocell base station to each of femtocell base stations transmitted the information indicating that the ordinal positions of the femtocell uplink frame and the femtocell downlink frame are switched.

According to yet another aspect of the present invention, there is also provided a macrocell base station including a networking unit to receive information on whether ordinal positions of a femtocell uplink frame and a femtocell downlink frame are switched, from each of a plurality of femtocell base stations, and a processor to select one of femtocell base stations transmitting the information among the plurality of femtocell base stations, as a relay femtocell base station to relay macrodata, wherein the networking unit transmits a request to relay the macrodata to the relay femtocell base station and transmits information associated with the relay femtocell base station to a macrocell terminal, and wherein the macrodata is data to be transmitted from the macro terminal to the macrocell base station.

Advantageous Effects

According to an aspect of the present invention, it is possible to provide a method and apparatus for switching ordinal positions of a femtocell uplink frame and a femtocell downlink frame when uplink interference in a macrocell is strong. A femtocell base station may recognize interference affecting a performance of the femtocell base station and avoid the interference, thereby enhancing the performance of the femtocell base station.

According to another aspect of the present invention, it is possible to provide a method and apparatus for switching ordinal positions of a femtocell uplink frame and a femtocell downlink frame and relaying macrodata to be transmitted from a macro terminal to a macro base station.

BEST MODE FOR CARRYING OUT THE INVENTION

Reference will now be made in detail to embodiments of the present invention, examples of which are illustrated in the accompanying drawings, wherein like reference numerals refer to the like elements throughout.

Figure 1:
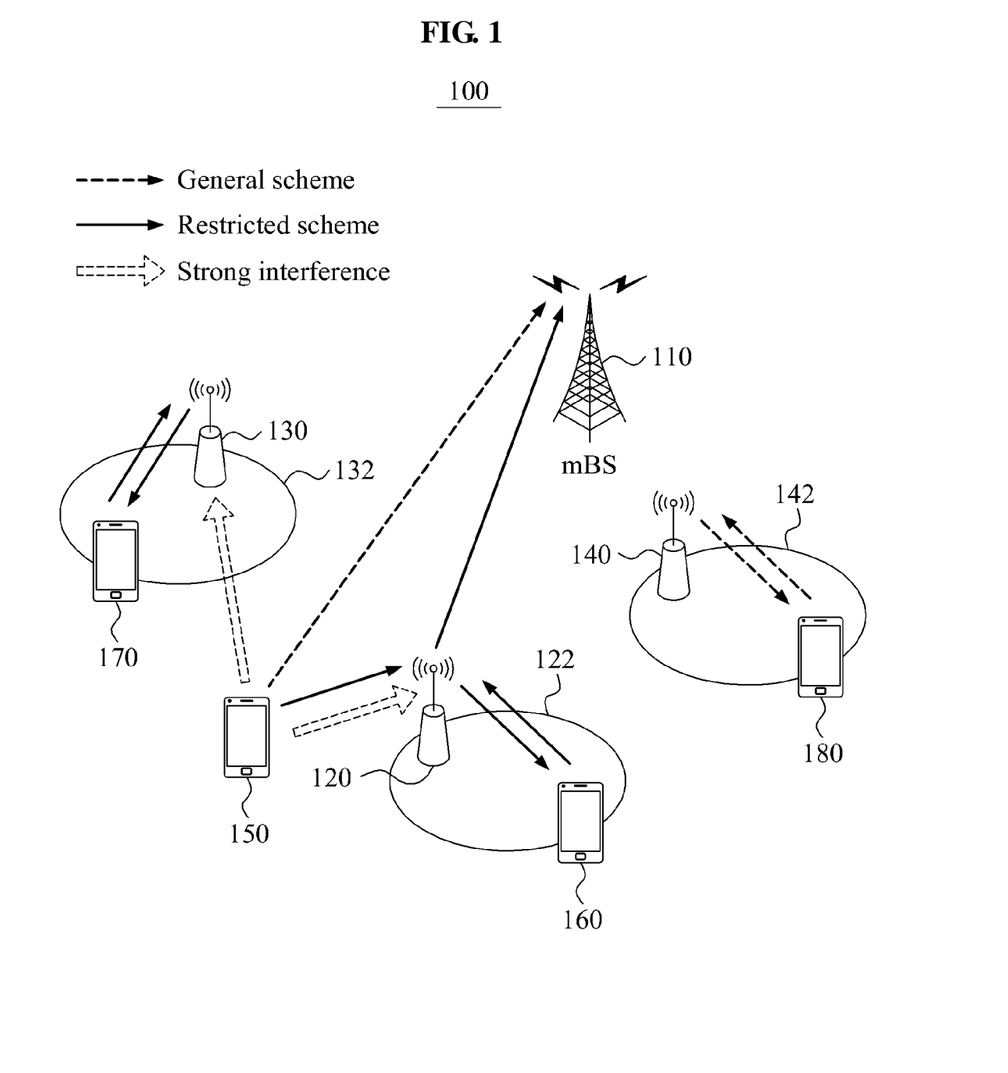
FIG. 1 is a diagram illustrating a heterogeneous cellular network system according to an example embodiment.

FIG. 1 is a diagram illustrating a heterogeneous cellular network system according to an example embodiment.

A heterogeneous cellular network system 100 may include a macrocell base station (mBS) 110, at least one femtocell base station (fBS), and at least one mobile station (MS).

In FIG. 1, a dashed arrow represents communication performed based on a scheme proposed in an example embodiment of the present invention, and a solid arrow represents communication performed based on a general scheme.

FIG. 1 illustrates a first fBS 120, a second fBS 130, and a third fBS 140 as the at least one fBS. The first fBS 120, the second fBS 130, and the third fBS 140 may be an fBS of a first femtocell 122, an fBS of a second femtocell 132, and an fBS of a third femtocell 142.

A terminal of the heterogeneous cellular network may be, for example, a macro mobile station (mMS) communicating with the mBS 110 and a femto mobile station (fMS) communicating with an fBS. FIG. 1 also illustrates an mBS 150, a first fMS 160 of the first femtocell 122, a second fMS 170 of the second femtocell 132, and a third fMS 180 of the third femtocell 132.

A macro uplink (UL) between the mMS 150 and the mBS 110 may cause interference affecting a femtocell. A solid arrow between the mMS 150 and the mBS 110 may represent communication for the macro UL. A degree of the interference affecting a performance for each femtocell may vary based on a distance between the mMS 150 and the at least one fBS. A degree of interference significantly affecting the performance for each femtocell may be referred to as strong interference. The performance for each femtocell may be performance for data communication of an fBS or a femtocell.

In FIG. 1, the macro UL may cause the strong interference affecting the first femtocell 122 and the second femtocell 132.

An fBS of the femtocell strongly interfered with the macro UL may communicate with at least one of the fMS, the mMS, and the mBS based on the scheme proposes in an example embodiment of the present invention as described hereinafter. An fBS of a femtocell not strongly interfered with the macro UL may communicate with at least one of the mBS 110, the mMS 150, and the fMS based on the general scheme.

An fBS may be selected from among fBSs performing communication based on the scheme proposed in an example embodiment of the present invention. The selected fBS may relay data communication from the mMS 150 to the mBS 110. In FIG. 1, the first fBS 120 may be selected as the fBS to relay the data communication.

A dashed arrow from the mMS 150 to the first fBS 120 and a dashed arrow from the first fBS 120 to the mBS 110 may represent communication related to the relaying.

Figure 2:
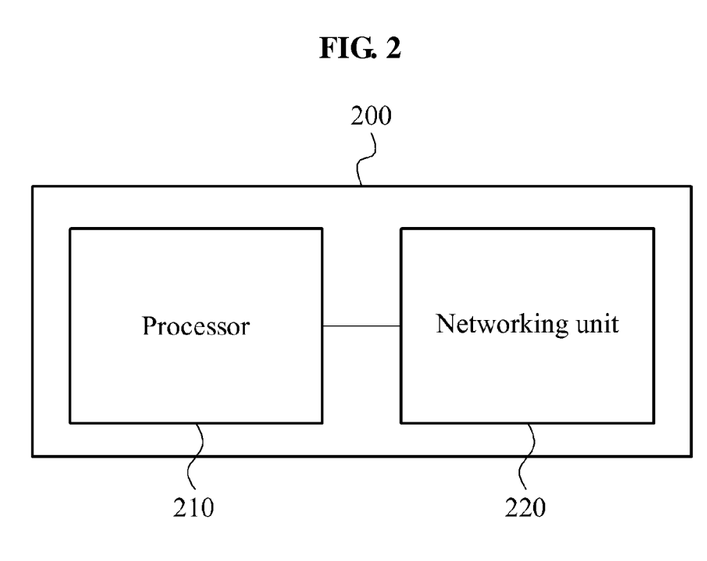
FIG. 2 is a block diagram illustrating a femtocell base station (fBS) according to an example embodiment.

FIG. 2 is a block diagram illustrating an fBS according to an example embodiment.

An fBS 200 may be, for example, the first fBS 120, the second fBS 130, and the third fBS 140 of FIG. 1.

The fBS 200 may include a processor 210 and a networking unit 220.

The processor 210 may be, for example, a general processor, a processor for communication, a system chip, and a server. The processor 210 may perform a process to operate the fBS 200.

The networking unit 220 may be, for example, a network chip and an antenna. The networking unit 220 may also be, for example, an antenna for wireless communication. The networking unit 220 may process an operation for data transmission and reception of the fBS 200, and transmit or receive a signal for the data transmission and reception. The processor 210 may transmit and receive data to operate the fBS 200 by controlling the networking unit 220.

Figure 3:
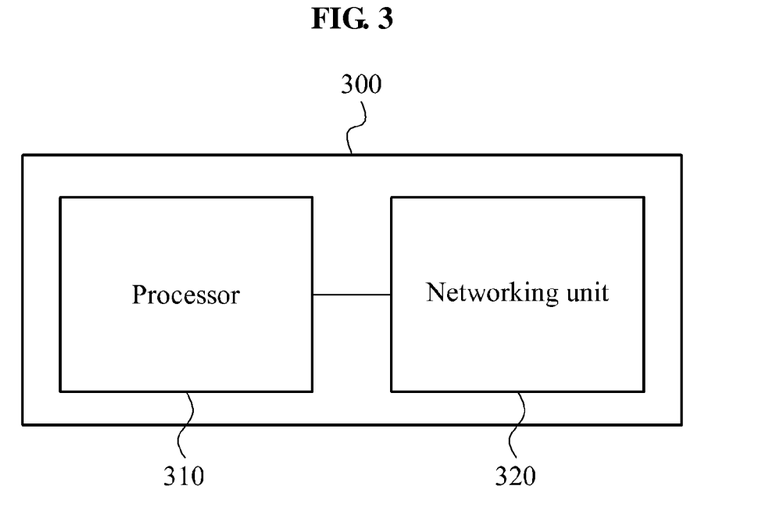
FIG. 3 is a block diagram illustrating a macrocell base station (mBS) according to an example embodiment.

FIG. 3 is a block diagram illustrating a macrocell base station (mBS) according to an example embodiment.

An mBS 300 may include a processor 310 and a networking unit 320. The mBS 300 may be, for example, the mBS 110 of FIG. 1.

The processor 310 may be, for example, a general processor, a processor for communication, a system chip, and a server. The processor 310 may perform a process to operate the mBS 300.

The networking unit 210 may be a network chip or an antenna. The networking unit 320 may also be, for example, an antenna for wireless communication. The networking unit 320 may process an operation for data transmission and reception of the fBS 200, and transmit or receive a signal for data transmission and reception. The processor 310 may transmit or receive data to operate the mBS 300 by controlling the networking unit 320.

Figure 4:
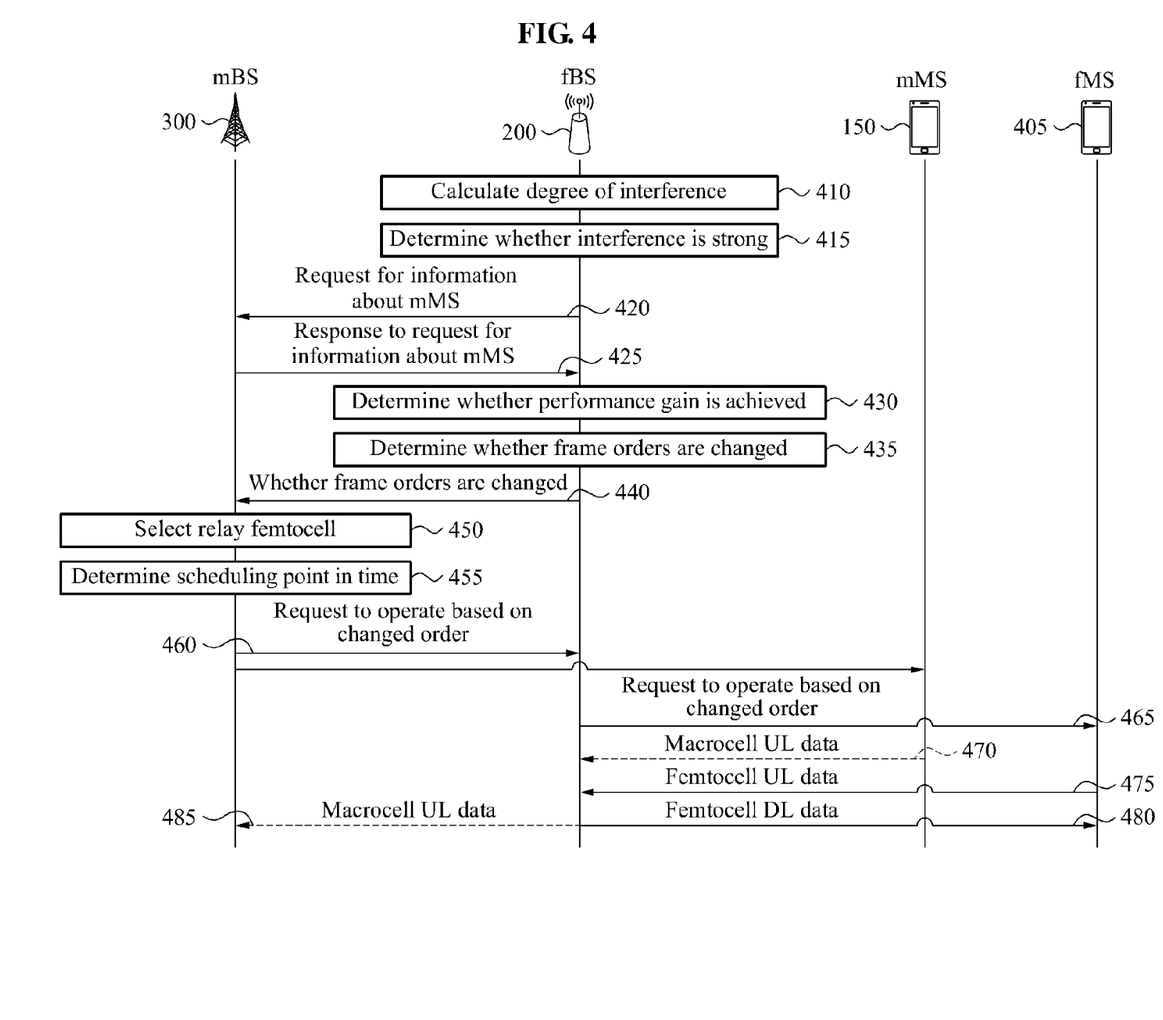
FIG. 4 is a signal flowchart illustrating a communication method of a heterogeneous cellular network system according to an example embodiment.

FIG. 4 is a signal flowchart illustrating a communication method of a heterogeneous cellular network system according to an example embodiment.

In operations 410, 415, 420, 425, 430, and 435, the processor 210 of the fBS 200 may determine whether an operation is performed by switching ordinal positions between a femtocell UL frame and a femtocell downlink (DL) frame of a femtocell, based on a degree to which interference caused by a macro UL affects a performance of the femtocell.

In operation 410, the processor 210 of the fBS 200 may calculate a degree of interference due to the macro UL in the heterogeneous cellular network system 100 and affecting the performance of the femtocell of the fBS 200. Hereinafter, the degree of interference due to the macro UL in the heterogeneous cellular network system 100 and affecting the performance of the femtocell of the fBS 200 may also be referred to as a degree of interference. In this example, the performance of the femtocell may be a performance for communication performed in the femtocell. For example, the performance of the femtocell may be at least one of a data rate of a femtocell UL and a data rate of a femtocell DL.

The processor 210 may calculate the degree of interference using Equation 1.

$$\sum_{t=1}^{T} \xi(t)$$ [Equation 1]

In Equation 1, $\xi(t)$ denotes an indicator function through which a result value is determined based on whether a reception interference-to-noise ratio (INR) is greater than a threshold value at a point in time t. In this example, interference at the) reception INR may be macro UL interference. For example, a value of $\xi(t)$ may be "1" when the reception INR is greater than the threshold value at the point in time t, and may be "0" in an inverse case. The point in time t may be a predetermined time. T may be a length of a predetermined time interval. T may be a predetermined time interval used as a measurement reference. The point in time t may be a predetermined point in time within T.

The processor 210 may calculate the degree of interference based on a number of reception INRs greater than the threshold value at corresponding points in time within a predetermined time interval. For example, the processor 210 may calculate the degree of interference due to the macro UL and affecting the femtocell of the fBS 200, based on the reception INRs.

In operation 415, the processor 210 may determine whether the interference due to the macro UL is strong interference based on the calculated degree of interference.

The processor 210 may determine that the interference due to the macro UL is the strong interference when a value of Equation 1, $$\sum_{t=1}^{T} \xi(t),$$

is greater than a false alarm probability κ required for a heterogeneous cellular network. Conversely, the processor 210 may determine that the interference due to the macro UL is not the strong interference in an inverse case.

When the interference due to the macro UL is not the strong interference, operations 420 through 485 may not be performed. Also, the fBS 200 may communicate with at least one of the mBS 110, the mMS 150, and the fMS based on a general scheme.

When the interference due to the macro UL is the strong interference, operations 420 through 485 may be performed.

In operation 420, the networking unit 220 of the fBS 200 may transmit a request for information associated with a predetermined mMS causing the strong interference, to the networking 320 of the mBS 300. In this example, the predetermined mMS may include the mMS 150. The fBS 200 may transmit information to the mBS 110 such that the mBS 110 verifies an mMS causing the strong interference. In this example, the information may include a time or a frequency domain affected by interference.

In operation 425, the networking unit 320 of the mBS 300 may transmit a response to the request for the information associated with the mMS 150, to the networking unit 220 of the fBS 200.

The information associated with the mMS 150 may include at least one of 1) a terminal identifier (ID) of the mMS 150, 2) information on an operation time of the mMS 150, 3) information on a frequency used by the mMS 150, 4) a frequency number used by the mMS 150, and 5) a data rate of the mMS 150.

The information associated with the mMS 150 may be used in operations 430 through 435 as described hereinafter.

In operation 430, the processor 210 of the fBS 200 may switch ordinal positions of the femtocell UL frame and the femtocell DL frame to determine whether a gain for a performance of the femtocell is achieved.

The processor 210 may compare a value of Equation 2 and a value of Equation 3 to determine whether the gain for the performance of the femtocell is achieved. When the value of Equation 2 is greater than the value of Equation 3, the processor 210 may determine that the gain is achieved.

When the value of Equation 2 is less than or equal to the value of Equation 3, the processor 210 may determine that the gain is not achieved.

$$\tilde{R}_{zf}^* \quad \text{[Equation 2]}$$

$$\overline{R}_{zf} \quad \text{[Equation 3]}$$

In Equation 2, $\tilde{R}_{zf}^*$ denotes an expected data rate from the fMS 405 f to the fBS 200 z, which may be achieved by switching the ordinal positions of the femtocell UL frame and the femtocell DL frame.

$\overline{R}_{zf}$ denotes an average data rate from the fMS 405 f to the fBS 200 z, which is measured before the ordinal positions of the femtocell UL frame and the femtocell DL frame are switched.

In operation 435, the processor 210 may determine whether the ordinal positions of the femtocell UL frame and the femtocell DL frame are switched, based on a result of the determining performed in operation 430.

In response to a determination that the gain for the performance of the femtocell is achieved, the processor 210 may determine to switch the ordinal positions of the femtocell UL frame and the femtocell DL frame. In response to the determining, operations 440 through 485 may be performed. In response to a determination that the gain for the performance of the femtocell is not achieved, the processor 210 may determine not to switch the ordinal positions of the femtocell UL frame and the femtocell DL frame. In response to the determining, operations 440 through 485 may not be performed.

In operation 440, the networking unit 220 of the fBS 200 may transmit information indicating whether the ordinal positions of the femtocell UL frame and the femtocell DL frame are switched, to the networking unit 320 of the mBS 300.

The processor 210 of the fBS 200 may transmit the information using the networking unit 220 only when the ordinal positions of the femtocell UL frame and the femtocell DL frame are switched.

In operation 450, the processor 310 of the mBS 300 may select a relay femtocell or a relay fBS to relay macrodata. The macrodata may be, for example, macrocell UL data.

The macrodata may need to be transmitted from the mMS 150 to the networking unit 320 of the mBS 300. A relay of the macrodata may refer to a process in which the networking unit 220 of the fBS 200 receives the macrodata from the mMS 150 and transfers the received macrodata to the networking unit 330 of the mBS 300.

The fBS 200 may be provided in a plural form. For example, the fBS 200 may be the first fBS 120, the second fBS 130, and the third fBS 140 of FIG. 1. Also, the fMS 405 may be, for example, the first fMS 160, the second fMS 170, and the third fMS 180 of FIG. 1.

Operations 410, 415, 420, 425, 430, 435, 440, 460, 465, 470, 475, 480, and 485 related to the fBS 200 may be performed by each of a plurality of fBSs. For example, in operation 440, networking units of the plurality of fBSs may transmit the information indicating whether the ordinal positions of the femtocell UL frame and the femtocell DL frame to the networking unit 320 of the mBS 300.

The processor 310 of the mBS 300 may select an fBS from fBSs transmitting the information indicating whether the ordinal positions of the femtocell UL frame and the femtocell DL frame among the plurality of fBSs, as the relay fBS to relay the macrodata.

The processor 310 of the mBS 300 may select the relay femtocell based on Equation 4.

$$\underset{z}{\operatorname{argmax}}\{\zeta_{zb}^t\} \quad \text{[Equation 4]}$$

In Equation 4, an fBS z may be the fBS of the fBSs transmitting the information indicating that the ordinal positions of the femtocell UL frame and the femtocell DL frame among the plurality of fBSs. $\zeta_{zb}^t$ may be an SNR from the fBS z to an mBS b. t may be a point in time used as a reference for selecting the relay femtocell.

The processor 310 may select the relay fBS based on Equation 4. For example, the processor 310 may select, as the relay fBS, an fBS corresponding to a maximum SNR of SNRs from each of fBSs transmitting information indicating that ordinal positions of frames are switched, to the mBS 110.

In operation 460, the networking unit 320 of the mBS 300 may transmit a request to the mMS 150 and the networking unit 220 of the fBS 200 to operate based on the switched ordinal positions. In this example, the request may be a request to switch the ordinal positions of the femtocell UL frame and the femtocell DL frame.

The request may include information on a scheduling point in time at which the operating is performed. The fBS 200 may switch the ordinal positions of the femtocell UL frame and the femtocell DL frame to operate. In this example, the scheduling point in time may be, for example, a time slot corresponding to predetermined consecutive femtocell UL frame and femtocell DL frame.

When the fBS 200 is selected as the relay fBS, the request to operate based on the switched ordinal positions may include a request for the relay of the macrodata. For example, in operation 460, the networking unit 320 may transmit the request to the relay fBS to relay the macrodata.

Also, the request transmitted to the mMS 150 to operate based on the switched ordinal positions may include information associated with the relay fBS. The mMS 150 may identify the fBS 200 to transmit the macrodata based on the information associated with the relay fBS in operation 470.

In operation 465, the networking unit 220 of the fBS 200 may transfer the request to the fMS 405 to operate based on the switched ordinal positions.

When the fBS 200 is the relay fBS, the networking unit 220 of the fBS 200 may process the relay of the macrodata in operations 470 and 485.

In operation 470, the mMS 150 may transmit the macrodata to the networking unit 220 of the fBS 200 corresponding to the relay fBS to relay the macrodata.

In operation 475, the networking unit 220 of the fbS 200 may transmit the femtocell UL frame based on the switched ordinal positions. The femtocell UL frame may include femtocell UL data transmitted from the fMS 405 to the fBS 200. The fMS 405 may transmit the femtocell UL data to the networking unit 220 of the fBS 200.

When the fBS 200 is the relay fBS, the fB 200 may divide a portion of the time slot allocated to the femtocell UF frame to use the divided portion of the time slot to relay and transmit the macrodata. Descriptions about a method of dividing the time slot allocated to the femtocell UL frame into time slots for transmitting the femtocell UL data and the macrodata will be described with reference to FIG. 6.

In operation 480, the networking unit 220 of the fBS 200 may transmit the femtocell DL frame based on the switched ordinal positions. The femtocell DL frame may include femtocell DL data transmitted from the fBS 200 to the fMS 405. The networking unit 220 of the fBS 200 may transmit the femtocell DL data to the fMS 405.

In operation 485, the fBS 200 corresponding to the relay fBS to relay the macrodata may transmit the macrodata to the mBS 300.

Operations 480 and 485 may be concurrently performed based on a superposition coding scheme. By controlling the networking unit 220 based on the overlap coding scheme, the processor 210 may transmit the macrodata to the mBS 300 while processing the transmitting of the femtocell DL frame concurrently.

The processor 210 may determine power allocation for the overlap coding scheme based on Equation 5. In this example, the power allocation may be performed by determining a ratio between first power used to transmit the femtocell DL data and second power used to transmit the macrodata.

$$\sum_{t=1}^{T} \frac{(1-\beta(t))\zeta_{zb}^{t}}{1+\beta(t)\zeta_{zb}^{t}+\eta_{fz}^{t}} = \overline{\gamma}_{mb} \qquad [\text{Equation 5}]$$

In Equation 5, $\beta(t)$ denotes an allocation ratio of the first power to a total amount of power at a point in time t. $\zeta_{zb}^{t}$ denotes an SNR from the fBS 200 z to the mBS 300 b at the point in time t. $\eta_{fz}^{t}$ denotes an INR from the fMS 405 f to the fBS 200 z at the point in time t. $\overline{\gamma}_{mb}$ denotes an average signal-to-interference-plus-noise ratio (SINR) from the mMS 150 m to the mBS 300 b in a predetermined time interval T.

Thus, the allocation ratio of the first power to a total amount of power and an allocation ratio of the second power to the total amount of power may be determined based on at least one of $\zeta_{zb}^{t}$, $\eta_{fz}^{t}$, and $\overline{\gamma}_{mb}$.

Operations 410 through 485 may be performed repetitively. Also, operations 420, 425, 440, 460, and 465 may be performed in operations 465 through 485. For example, operation 465 may be processed through operation 480 performed previously.

Figure 5:
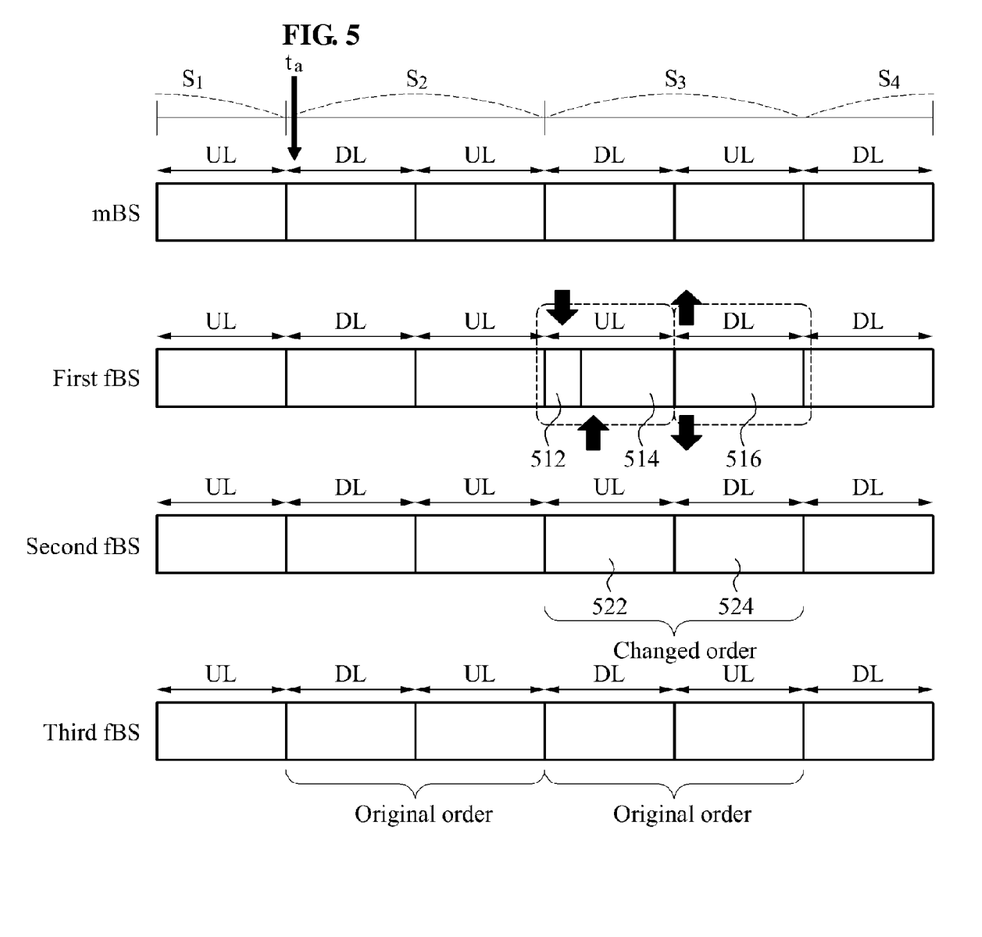
FIG. 5 is a diagram illustrating frames in a heterogeneous cellular network system according to an example embodiment.

FIG. 5 is a diagram illustrating frames in a heterogeneous cellular network system according to an example embodiment.

In FIG. 5, an x axis may be a time axis. A time slot may be divided based on scheduling points in time $S_1$, $S_2$, $S_3$, and $S_4$. Rows on a y axis may represent frames of the mBS 110, frames of the first fBS 120, frames of the second fBS 130, and frames of the third fBS 140.

Each block of FIG. 5 may indicate a frame. UL indicated above a block indicates that a corresponding frame is a UL frame. DL indicated above a block indicates that a corresponding frame is a DL frame.

The first fBS 120 and the second fBS 130 may switch ordinal positions of a femtocell UL frame and a femtocell DL frame at a scheduling point in time $S_3$.

The third fBS 140 may maintain original orders of the femtocell DL frame and the femtocell UL frame.

$t_a$ may be a point in time of performing operation 460 in which the networking unit 320 of the mBS 300 transmits a request to each of the mMS 150 and the networking unit 220 of the fBS 200 to operate based on the switched ordinal positions.

$S_3$ may be a scheduling point in time at which an operation is performed based on the switched ordinal positions.

For example, the first fBS 120 and the second fBS 130 receiving a request to operate based on the switched ordinal positions in operation 460 may switch the ordinal positions of the femtocell UL frame and the femtocell DL frame at the scheduling point in time $S_3$.

A first frame 512 may be a frame including macrodata transmitted from the mMS 150 to the first fBS 120 in operation 470.

A second frame 514 may be a femtocell UL frame including femtocell UL data transmitted from the fMS 405 to the first fBS 120 in operation 475.

A time slot assigned to the femtocell UL frame may be divided for the first frame 512 and the second frame 514. Description about a method of dividing the time slot will be provided with reference to FIG. 6.

A third frame 516 may be a frame transmitted using an overlap coding scheme in operations 480 and 485 concurrently. The frame may include femtocell data transmitted from the first fBS 120 to the fMS 405 and macrodata transmitted from the first fBS 120 to the mBS 300. Also, the frame may be, for example, the femtocell DL frame.

A fourth frame 522 may be a femtocell UL frame including femtocell UL data transmitted from the fMS 405 to the second fBS 130 in operation 475.

A fifth frame 524 may be a femtocell DL frame including femtocell DL data transmitted from the second fBS 130 to the fMS 405 in operation 480.

Referring to FIG. 5, similarly to a transmission performed at, for example, $S_2$, a transmission of the femtocell UL frame may be performed while a macrocell UL frame is being transmitted, and a transmission of the femtocell DL frame may be performed while a macrocell DL frame is being transmitted based on original, for example, unswitched ordinal positions of the femtocell UL frame and the femtocell DL frame. In addition, similarly to a transmission performed for each of the first fBS 120 and the second fBS 130 at, for example, $S_3$, the femtocell UL frame may be transmitted based on the switched ordinal positions while the macrocell DL frame is being transmitted. Also, the femtocell DL frame may be transmitted based on the switched ordinal positions while the macrocell UL frame is being transmitted.

Figure 6:
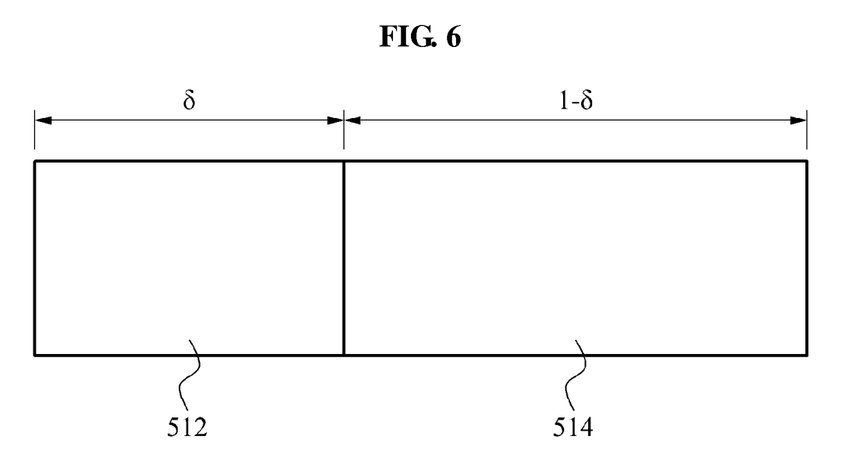
FIG. 6 is a diagram illustrating a method of dividing a time slot allocated to a femtocell uplink (UL) frame according to an example embodiment.

FIG. 6 is a diagram illustrating a method of dividing a time slot allocated to a femtocell UL frame according to an example embodiment.

The time slot allocated to the femtocell UL frame may be divided for the first frame 512 and the second frame 514 of FIG. 5.

$\delta$ may indicate a ratio of a time slot allocated to the first frame 512 to the time slot allocated to the femtocell UL frame. $1-\delta$ may indicate a ratio of a time slot allocated to the second frame 514 to the time slot allocated to the femtocell UL frame.

$\delta$ may be calculated using Equation 6.

$$\delta = \frac{\overline{R}_{mb}}{\overline{R}_{mz}^{*}} \qquad [\text{Equation 6}]$$

In Equation 6, $\overline{R}_{mz}^{*}$ denotes an expected data rate from the mMS 150 m to the fBS 200 z in a UL frame time. $\overline{R}_{mb}$ denotes an average data rate from the mMS 150 m to the mBS 300 b, which is measured during the UL frame time.

Thus, a ratio of a time slot divided to transmit macrodata to an entire time slot allocated to the femtocell UL frame may be calculated and determined based on at least one of $\overline{R}_{mz}^{*}$ and $\overline{R}_{mb}$.

The units described herein may be implemented using hardware components and software components. For example, the hardware components may include microphones, amplifiers, band-pass filters, audio to digital convertors, and processing to devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A communication method of a femtocell base station, the method comprising:
   determining whether an operation is to be performed by switching ordinal positions of a femtocell uplink frame and a femtocell downlink frame in a femtocell based on a degree to which macro uplink interference affects a performance of the femtocell in the femtocell base station;
   receiving, from a macrocell base station, a request to relay macrodata to be transmitted from a macrocell terminal to the macrocell base station;
   receiving the macrodata from the macrocell terminal;
   processing a transmission of the femtocell uplink frame based on the switched ordinal positions;
   processing a transmission of the femtocell downlink frame based on the switched ordinal positions; and
   transmitting the macrodata to the macrocell base station,
   wherein the processing of the transmission of the femtocell downlink frame and the transmitting of the macrodata to the macrocell base station are concurrently performed based on a superposition coding scheme.

2. The method of claim 1, wherein the determining comprises calculating the degree based on a reception signal-to-noise ratio (SNR) for each point in time within a predetermined time interval.

3. The method of claim 1, wherein the determining comprises determining whether a gain of the performance is achieved by switching the ordinal positions of the femtocell uplink frame and the femtocell downlink frame.

4. The method of claim 3, further comprising:
   transmitting a request for information associated with a macrocell terminal to a macrocell base station; and
   receiving a response to the request from the macrocell base station.

5. The method of claim 1, further comprising:
   transmitting, to a macrocell base station, information on whether the ordinal positions of the femtocell uplink frame and the femtocell downlink frame are switched.

6. The method of claim 1, wherein the femtocell uplink frame comprises femtocell uplink data transmitted from a femtocell terminal to the femtocell base station, and the femtocell downlink frame comprises femtocell downlink data transmitted from the femtocell base station to the femtocell terminal.

7. The method of claim 1, wherein the transmission of the femtocell uplink frame based on the switched ordinal positions is performed during a process of transmitting a macrocell downlink frame in a macrocell base station, and the transmission of the femtocell downlink frame based on the switched ordinal positions is performed during a process of transmitting a macrocell uplink frame in the macrocell base station.

8. A femtocell base station comprising:
   a processor to determine whether an operation is to be performed by switching ordinal positions of a femtocell uplink frame and a femtocell downlink frame in a femtocell based on a degree to which macro uplink interference affects a performance of the femtocell in the femtocell base station; and a networking device to process a transmission of the femtocell uplink frame and a transmission of the femtocell downlink frame based on the switched ordinal positions, wherein the networking device receives from a macrocell base station a request to relay macrodata to be transmitted from a macro terminal to the macrocell based station, receives the macrodata from the macrocell terminal, and transmits the macrodata to the macrocell base station, wherein the processor transmits the macrodata to the macrocell base station while processing the transmitting of the femtocell downlink frame concurrently by controlling the networking device based on a superposition coding scheme.

9. A communication method of a macrocell base station, the method comprising:
receiving information on whether ordinal positions of a femtocell uplink frame and a femtocell downlink frame are switched, from each of a plurality of femtocell base stations;
selecting one of femtocell base stations transmitting the information among the plurality of femtocell base stations, as a relay femtocell base station to relay macrodata;
transmitting the request to the relay femtocell base station; and
transmitting information associated with the relay femtocell base station to a macrocell terminal,
wherein the macrodata is data to be transmitted from the macro terminal to the macrocell base station,
wherein the relay femtocell base station is a femtocell base station corresponding to a maximum singal-to-noise (SNR) among SNRs of the macrocell base station to each of femtocell base stations transmitted the information indicating that the ordinal positions of the femtocell uplink frame and the femtocell downlink frame are switched.

10. A macrocell base station comprising:
a networking device to receive information on whether ordinal positions of a femtocell uplink frame and a femtocell downlink frame are switched, from each of a plurality of femtocell base stations; and
a processor to select one of femtocell base stations transmitting the information among the plurality of femtocell base stations, as a relay femtocell base station to relay macrodata,
wherein the networking device transmits a request to relay the macrodata to the relay femtocell base station and transmits information associated with the relay femtocell base station to a macrocell terminal,
wherein the macrodata is data to be transmitted from the macro terminal to the macrocell base station, and
wherein the relay femtocell base station is a femtocell base station corresponding to a maximum signal-to-noise (SNR) among SNRs of the macrocell base station to each of femtocell base stations transmitted the information indicating that the ordinal positions of the femtocell uplink frame and the femtocell downlink frame are switched.

* * * * *